US009830446B2

United States Patent
Dubey et al.

(10) Patent No.: US 9,830,446 B2
(45) Date of Patent: Nov. 28, 2017

(54) RETURN MATERIAL AUTHORIZATION FULFILLMENT SYSTEM FOR SMART GRID DEVICES WITH CUSTOMER SPECIFIC CRYPTOGRAPHIC CREDENTIALS

(71) Applicant: SILVER SPRING NETWORKS, INC., Redwood City, CA (US)

(72) Inventors: Aditi Dubey, Redwood City, CA (US); Benjamin N. Damm, San Francisco, CA (US); Michael StJohns, Germantown, MD (US)

(73) Assignee: SILVER SPRING NETWORKS, INC., San Jose, CA (US)

( * ) Notice: Subject to any disclaimer, the term of this patent is extended or adjusted under 35 U.S.C. 154(b) by 64 days.

(21) Appl. No.: 14/515,920

(22) Filed: Oct. 16, 2014

(65) Prior Publication Data

US 2015/0106894 A1     Apr. 16, 2015

Related U.S. Application Data

(60) Provisional application No. 61/891,688, filed on Oct. 16, 2013.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *G06F 21/45* | (2013.01) |
| *G06F 21/60* | (2013.01) |
| *G06F 21/64* | (2013.01) |

(52) U.S. Cl.
CPC ............ *G06F 21/45* (2013.01); *G06F 21/604* (2013.01); *G06F 21/64* (2013.01); *Y04S 40/24* (2013.01)

(58) Field of Classification Search
CPC ... H04L 12/803; H04L 12/2818; G06F 21/44; G06F 21/45; G06F 21/60; G06F 21/604; G06F 21/64; Y04S 40/24
USPC .......................................... 713/168; 726/4, 6
See application file for complete search history.

(56) References Cited

U.S. PATENT DOCUMENTS

| | | | |
|---|---|---|---|
| 8,157,647 B2 * | 4/2012 | House ................ | G06Q 20/3674 273/138.1 |
| 9,038,910 B2 * | 5/2015 | Yang .................... | G06K 7/1417 235/375 |

(Continued)

*Primary Examiner* — Eric W Shepperd
*Assistant Examiner* — Feliciano Mejia
(74) *Attorney, Agent, or Firm* — Buchanan Ingersoll & Rooney PC

(57) ABSTRACT

A method for removing credentials from a smart grid device includes: receiving, by a receiving device, a removal request, wherein the removal request includes a device identifier associated with a smart grid device and is signed by an entity associated with a set of security credentials stored in a memory of the smart grid device, the set of security credentials restricting access to one or more components or operations of the smart grid device; extracting, by a processing device, the device identifier included in the received removal request; generating, by the processing device, a permit configured to remove the set of credentials from the smart grid device, wherein the generated permit includes the extracted device identifier; and transmitting, by a transmitting device, the generated permit to the smart grid device for removal of the set of credentials from the memory of the smart grid device.

14 Claims, 4 Drawing Sheets

100

(56) References Cited

U.S. PATENT DOCUMENTS

| | | | | |
|---|---|---|---|---|
| 2011/0313836 A1* | 12/2011 | Walsh | ............... | G06Q 30/0225 |
| | | | | 705/14.26 |
| 2011/0314163 A1* | 12/2011 | Borins | ............... | H04W 4/005 |
| | | | | 709/227 |
| 2012/0173873 A1* | 7/2012 | Bell | ............... | H04L 9/321 |
| | | | | 713/156 |
| 2012/0328101 A1* | 12/2012 | Lakshminarayanan | ............... | |
| | | | | H04L 63/0823 |
| | | | | 380/258 |
| 2013/0232556 A1* | 9/2013 | Tan | ............... | H04L 63/08 |
| | | | | 726/4 |
| 2013/0314249 A1* | 11/2013 | Le Buhan | ............... | G01D 4/002 |
| | | | | 340/870.02 |
| 2014/0143826 A1* | 5/2014 | Sharp | ............... | G06F 21/604 |
| | | | | 726/1 |
| 2014/0375474 A1* | 12/2014 | Dietrich | ............... | G06F 21/44 |
| | | | | 340/870.02 |

\* cited by examiner

RETURN MATERIAL AUTHORIZATION FULFILLMENT SYSTEM FOR SMART GRID DEVICES WITH CUSTOMER SPECIFIC CRYPTOGRAPHIC CREDENTIALS

FIELD

The present disclosure relates to the removal of cryptographic credentials from a smart grid device, specifically the use of a permit signed by an entity associated with the cryptographic credentials for removal thereof in the smart grid device.

BACKGROUND

Smart meters, and other smart grid devices, such as streetlights, load control devices, sensors, etc., that are used by utilities and other similar types of entities are often loaded with specific cryptographic credentials of the owner to ensure that the utility or other entity has access to operations of the smart device, while preventing access for others. In many instances, a set of cryptographic credentials associated with a utility may be used across a plurality of their smart meters, such that a valid set of credentials can be used by an employee or authorized user to access each of the smart meters, without the need to possess a large number of credentials or remember what credentials are for which device.

When a smart grid device has a problem and must be repaired, the utility can return the smart grid device to the device vendor, a repair vendor, or other suitable entity in order to assess the problems and repair the smart grid device. However, if a smart grid device has cryptographic credentials on it that tie it to a specific owner, vendors are often unable to access vital operations of the smart grid device unless in possession of the appropriate owner credentials. In many instances, a utility may be wary of providing proper cryptographic credentials to the vendor, as it can provide the vendor with access to all of the utility's smart devices and not just the problematic device.

One method that is used to remove credentials from a smart grid device includes tampering with a smart grid device that is configured to remove all credentials from the device when tampering is identified as part of previously configured anti-tampering mechanism. However, in some instances the removal of all of the credentials from a device may not be desirable, as the device may therefore require additional steps in refurbishment in order to return the device to working order. For example, a smart meter that has networking capabilities may require security credentials for the network in addition to security credentials used by a utility for utility operations. If the smart meter was tampered with as part of a repair or servicing process, the network security credentials would need to be loaded back onto the smart meter prior to reuse of the meter, which may cost significant time and resources for both the servicing vendor and the entity responsible for the network security credentials.

Thus, there is a need for a technical system where a specific set of cryptographic credentials can be removed from a smart grid device by a vendor without use of the credentials themselves.

SUMMARY

The present disclosure provides a description of systems and methods for removing credentials from a smart grid device.

A method for removing credentials from a smart grid device includes: receiving, by a receiving device, a removal request, wherein the removal request includes a device identifier associated with a smart grid device and is signed by an entity associated with a set of security credentials stored in a memory of the smart grid device, the set of security credentials restricting access to one or more components or operations of the smart grid device; extracting, by a processing device, the device identifier included in the received removal request; generating, by the processing device, a permit configured to remove the set of credentials from the smart grid device, wherein the generated permit includes the extracted device identifier; and transmitting, by a transmitting device, the generated permit to the smart grid device for removal of the set of credentials from the memory of the smart grid device.

A system for removing credentials from a smart grid device includes a receiving device, a processing device, and a transmitting device. The receiving device is configured to receive a removal request, wherein the removal request includes a device identifier associated with a smart grid device and is signed by an entity associated with a set of security credentials stored in a memory of the smart grid device, the set of security credentials restricting access to one or more components or operations of the smart grid device. The processing device is configured to: extract the device identifier included in the received removal request; and generate a permit configured to remove the set of credentials from the smart grid device, wherein the generated permit includes the extracted device identifier. The transmitting device is configured to transmit the generated permit to the smart grid device for removal of the set of credentials from the memory of the smart grid device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Removal of Credentials from a Smart Grid Device

Figure 1:
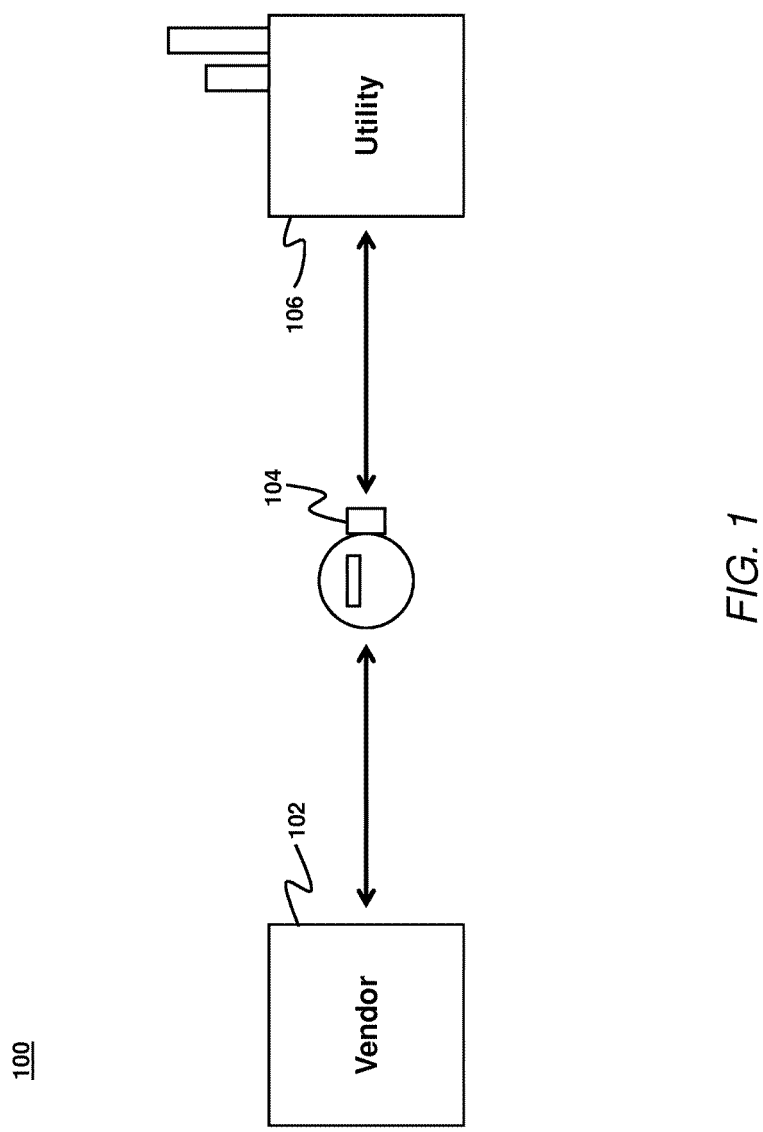
FIG. 1 is a block diagram illustrating a system for removing cryptographic credentials from a smart grid device in accordance with exemplary embodiments.

FIG. 1 illustrates a system 100 for the removal of security credentials from a smart grid device. It will be apparent to persons having skill in the relevant art that, while the system 100 and the discussed herein is with reference to a smart meter, the methods and systems discussed herein are applicable to any suitable type of smart grid device, such as a streetlight, load control device, sensor, or any other type of device that includes customer-provided security credentials.

The system 100 may include a vendor 102. The vendor 102 may be an entity that is authorized to repair, service, manufacture, maintain, or otherwise interface with smart meters 104. The vendor 102 may be, for example, the manufacturer of the smart meter 104, an authorized service or repair vendor, etc. The smart meter 104 may be operated by a utility 106 or other suitable entity. As part of the operation of the smart meter 104 by the utility 106, the utility 106 may load a set of security credentials, such as cryptographic credentials, on the smart meter 104.

The security credentials may be such that only a user who provides the valid security credentials may have access to associated operations of the smart meter. In some instances, the security credentials may be associated with ownership of the smart meter 104. For example, the security credentials being associated with the utility 106 may indicate that the utility 106 owns the smart meter 104.

When the smart meter 104 develops a problem, the utility 106 may provide the smart meter 104 to the vendor 102 for diagnosis, service, repair, etc. In order to enable the vendor 102 to perform all of the necessary functions of the smart meter 104, including those for which the proper security credentials must be supplied, the utility 106 may provide the vendor 102 with information suitable for removal of the security credentials from the smart meter 104 using the methods and systems discussed herein.

By removing the security credentials rather than providing the vendor 102 with their own credentials to use to access the operations, the vendor 102 can perform their requisite tasks without being provided access to additional smart meters 104 owned by the utility 106 and without compromising the utility's 106 credentials. In addition, if the smart meter 104 is being furnished to the vendor 102 for return material authorization (RMA) rather than a repair and return servicing, the removal of the security credentials enables the vendor 102 to refurbish and resell the repaired smart meter 104; whereas, if the security credentials were kept on the smart meter 104 and accessed by the vendor 102, the smart meter 104 could not be sold to a third party without further compromising the security of the utility 106. As a result, the systems and methods discussed herein provide for added security and added effectiveness for both the vendor 102 and the utility 106.

Process for Removal of Credentials in a Smart Meter

Figure 2:
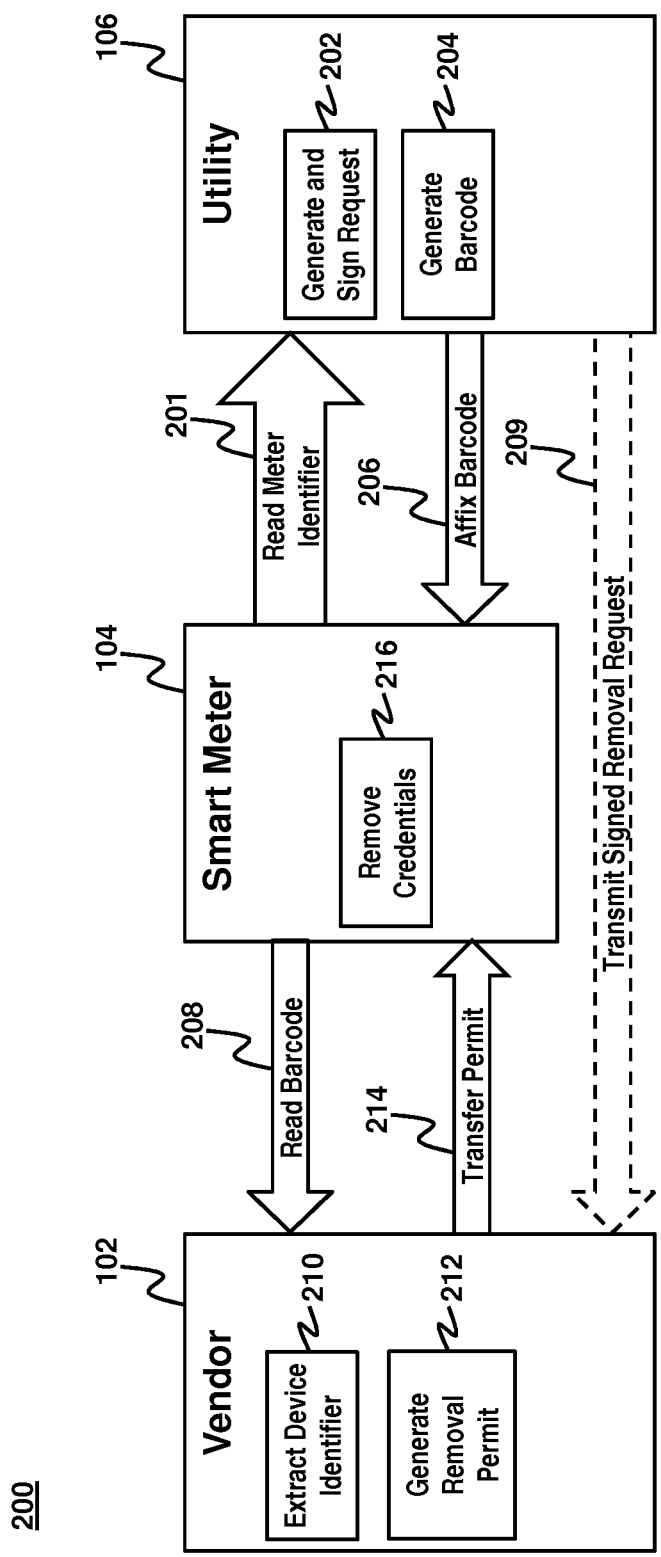
FIG. 2 is a flow diagram illustrating a process for the removal of security credentials from a smart grid device using the system of FIG. 1 in accordance with exemplary embodiments.

FIG. 2 illustrates a process 200 for the removal of security credentials from the smart meter 104 using the system 100 of FIG. 1.

In step 201, the utility 106 may read a device identifier from the smart meter 104. The device identifier may be any unique value associated with the smart meter 104 suitable for the identification there, such as a media access control address, serial number, registration number, or other value that will be apparent to persons having skill in the relevant art. In step 202, the utility 106 may generate a removal request. The removal request may include the device identifier associated with the smart meter 104 read by the utility 106 that may be used by the vendor 102 to remove the security credentials from the smart meter 104 that are associated with the utility 106. The utility 106 may also sign the removal request using a private key in possession of the utility 106, which may cryptographically sign the removal request such that only an authorized entity (e.g., in possession of the corresponding public key) may be able to identify the data included in the removal request.

In step 204, the utility 106 may generate a barcode that includes the signed removal request encoded therein. The barcode may be a two-dimensional barcode, such as QR code, a barcode formatted pursuant to the PDF417 standard, or other suitable type of barcode that can encode the signed removal request. In step 206, the barcode may be affixed to the smart meter 104 that is to be serviced or repaired. For example, the barcode may be printed on a sticker that is placed on the smart meter 104. In another example, the barcode may be printed on a paper that accompanies the smart meter 104 to the vendor 102, such as a packing slip, work order, etc.

The smart meter 104 may then be provided to the vendor 102. In some embodiments, the smart meter 104 may be sent to the vendor 102 in a batch of smart meters, such as a collection of smart meters to be serviced, repaired, returned, etc. In step 208, the vendor 102 may read the barcode, such as by using a barcode scanner, optical imaging device, or other suitable device. Reading the barcode may include reading the signed removal request encoded therein.

In some embodiments, the method 200 may include a step 209, where the utility 106 may provide the signed removal request directly to the vendor 102. For instance, the utility 106 may provide the signed removal request as an authorization code in documentation accompanying the smart meter 104, such as on physical paper that is sent with the smart meter 104, via electronic-mail that is sent when the smart meter 104 is delivered, or other suitable method. In such an embodiment, the vendor 102 may receive the signed removal request directly rather than read the removal request encoded in a barcode. In such an instance, steps 204 through 208 may be replaced by the transmission of the signed permit request from the utility 106 to the vendor 102 in step 209 using methods that will be apparent to persons having skill in the relevant art.

Once the signed removal request has been obtained by the vendor 102, the vendor 102 may, in step 210, extract the device identifier for the smart meter 104 from the signed removal request. In some instances, extraction of the device identifier may first include verification of the removal request. The removal request may be verified using a public key associated with the private key used by the utility 106 to sign the removal request. Verification of the removal request may ensure that the utility 106 is authorized to request the removal of the associated security credentials from the smart meter 104.

Once the device identifier has been extracted, then, in step 212, the vendor 102 may generate a removal permit. The removal permit may include the device identifier and any other information included in the received removal request that may be necessary for removal of the set of credentials in the smart meter 104. In step 214, the vendor 102 may transfer the generated removal permit to the smart meter 104 using traditional methods and systems for communicating with smart meters 104 that will be apparent to persons having skill in the relevant art. In step 216, the smart meter 104 may validate the removal permit, and, if valid, may remove the security credentials from the device. In instances where the security credentials may be associated with ownership of the device, the removal thereof may include the resetting of ownership to the device as being unowned.

Vendor System and Smart Meter

Figure 3:
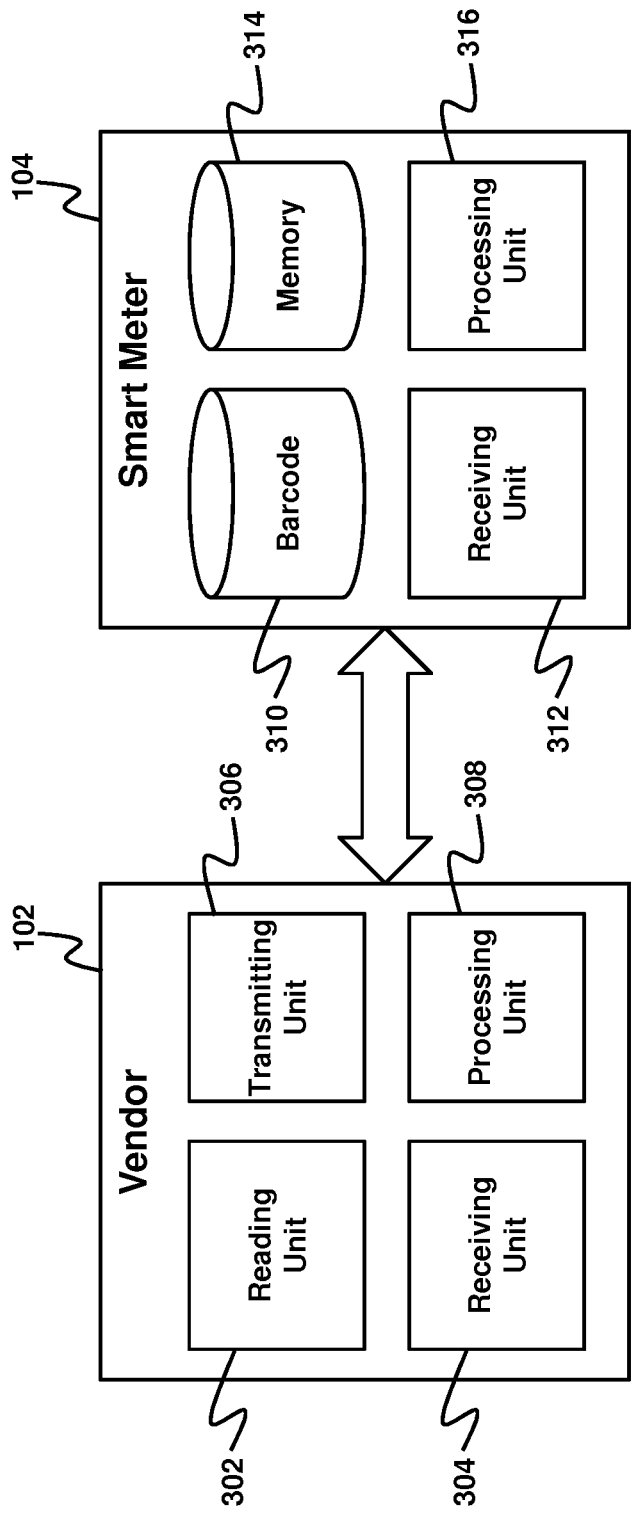
FIG. 3 is a block diagram illustrating an architecture of the vendor and smart grid device of FIG. 1 for use thereof in removal of security credentials from the smart grid device in accordance with exemplary embodiments.

FIG. 3 illustrates a high level computer architecture of the vendor 102 and the smart meter 104 (e.g., or other suitable smart grid device) for performing the functions discussed herein. It will be apparent to persons having skill in the relevant art that the computer architectures of the vendor 102 and smart meter 104 illustrated in FIG. 3 and discussed herein are provided as illustration only, and that additional and/or alternative architectures may be suitable for performing the discussed functions of the vendor 102 and smart meter 104. For instance, the vendor 102 and/or smart meter 104 may include a plurality of additional or alternative components, which may be included in one or more computing systems comprised thereof.

The vendor 102 may include a reading unit 302. The reading unit 302 may be configured to read data encoded in barcodes, such as two-dimensional barcodes, such as barcodes configured pursuant to the PDF417 standard. The reading unit 302 may be, for example, a barcode reader, an optical imager, a camera, or other suitable device. The reading unit 302 may be configured to read a barcode 310 affixed to the smart meter 104. The barcode 310 may be encoded with a removal request that has been signed by the utility 106 and includes a device identifier associated with the smart meter 104.

The vendor 102 may also include a receiving unit 304. The receiving unit 304 may be configured to receive data over one or more networks via one or more network protocols. The receiving unit 304 may receive data from the utility 106, such as authorization codes for the removal of security credentials from the smart meter 104. The authorization code may be, for instance, a removal request that includes the device identifier associated with the smart meter 104. The receiving unit 304 may also receive a public key from the utility 106, such as a public key that corresponds to a private key used by the utility 106 to sign removal requests. The receiving unit 304 may also be configured to receive data from the smart meter 104, such as operational data, repair data, service data, and other information that may be received from a smart meter 104.

The vendor 102 may further include a transmitting unit 306. The transmitting unit 306 may be configured to transmit data over one or more networks via one or more network protocols. The transmitting unit 206 may transmit data to the utility 106, such as requests for authorization codes, notifications, and other data that will be apparent to persons having skill in the relevant art. The transmitting unit 206 may also be configured to transmit data to the smart meter 104, such as a removal permit for the removal of security credentials stored therein. The transmitting unit 206 may also transmit other data to the smart meter 104, such as data used in the operation, servicing, and repair of the smart meter 104.

The vendor 102 may also include a processing unit 308. The processing unit 308 may be configured to perform the functions of the vendor 102 discussed herein as will be apparent to persons having skill in the relevant art. The processing unit 308 may be configured to verify received removal requests. Verification of received removal requests may include verifying the signing of the removal requests using a public key received by the receiving unit 304. In some instances, the vendor 102 may also include a memory or other storage device in which a public key may be stored and used by the processing unit 308. The processing unit 308 may also be configured to extract device identifiers from verified removal requests, such as by extracting a media access control address from a decoded barcode or received authorization code.

The processing unit 308 may be further configured to generate removal permits. A removal permit may include at least a device identifier associated with the smart meter 104 whose security credentials are being removed, and any other data suitable for use in the removal of the security credentials. One example of a permit that can be used to command the meter to remove credentials is disclosed in U.S. Patent Publication No. 2014/0281528, entitled "Secure End-to-End Permitting System for Device Operations," filed on Mar. 15, 2013, by Aditi Dubey et al., which is herein incorporated by reference in its entirety. In some embodiments, the processing unit 308 may also be configured to cryptographically sign removal permits, such as for use by the smart meter 104 in verifying that a removal permit has been provided by an authorized entity.

The smart meter 104 may include a receiving unit 312. The receiving unit 312 of the smart meter 104 may be configured to receive data over one or more networks via one or more network protocols. The receiving unit 312 may receive data from the vendor 102, such as removal permits, operational data, repair and service requests, etc. The receiving unit 312 may also receive data from the utility 106, such as data received in the routine operation of the smart meter 104 by the utility 106. In some instances, the smart meter 104 may be directly connected to the utility 106 and/or vendor 102, and may receive data accordingly.

The smart meter 104 may also include a memory 314. The memory 314 may be configured to store data suitable for performing the functions of the smart meter 104 discussed herein. For example, the memory 314 may store one or more sets of security credentials, including a set of security credentials associated with the utility 106 that is to be removed by instruction of the vendor 102. The memory 314 may also store the device identifier associated with the smart meter 104, program code for operations performed by the smart meter 104, meter reading data, operational instructions, communications data, etc. Additional data stored in the memory 314 will be apparent to persons having skill in the relevant art.

The smart meter 104 may further include a processing unit 316. The processing unit 316 may be configured to perform the functions of the smart meter 104 discussed herein as will be apparent to persons having skill in the relevant art. The processing unit 316 may be configured to verify removal permits received by the receiving unit 312. Verification of removal permits may include verifying one or more items of data included in or accompanying a removal permit, such as a device identifier, permit signature, etc. The processing unit 316 may be further configured to remove the set of security credentials stored in the memory 314 upon receipt and verification of the removal permit.

In some embodiments, the smart meter 104 may also include a transmitting unit. The transmitting unit may be configured to transmit data over one or more networks via one or more network protocols. For example, the transmitting unit may transmit operational data to the vendor 102, utility 106, or other suitable entity.

In some instances, the vendor 102 and smart meter 104 may include additional or alternative components that may be configured to perform functions additional to those discussed herein. For example, the components of the vendor 102 and smart meter 104 may be further configured to perform functions associated with the routine use, service, maintenance, and repair of smart meters. Such functions will be apparent to persons having skill in the relevant art.

Method for Removing Credentials in a Smart Meter

Figure 4:
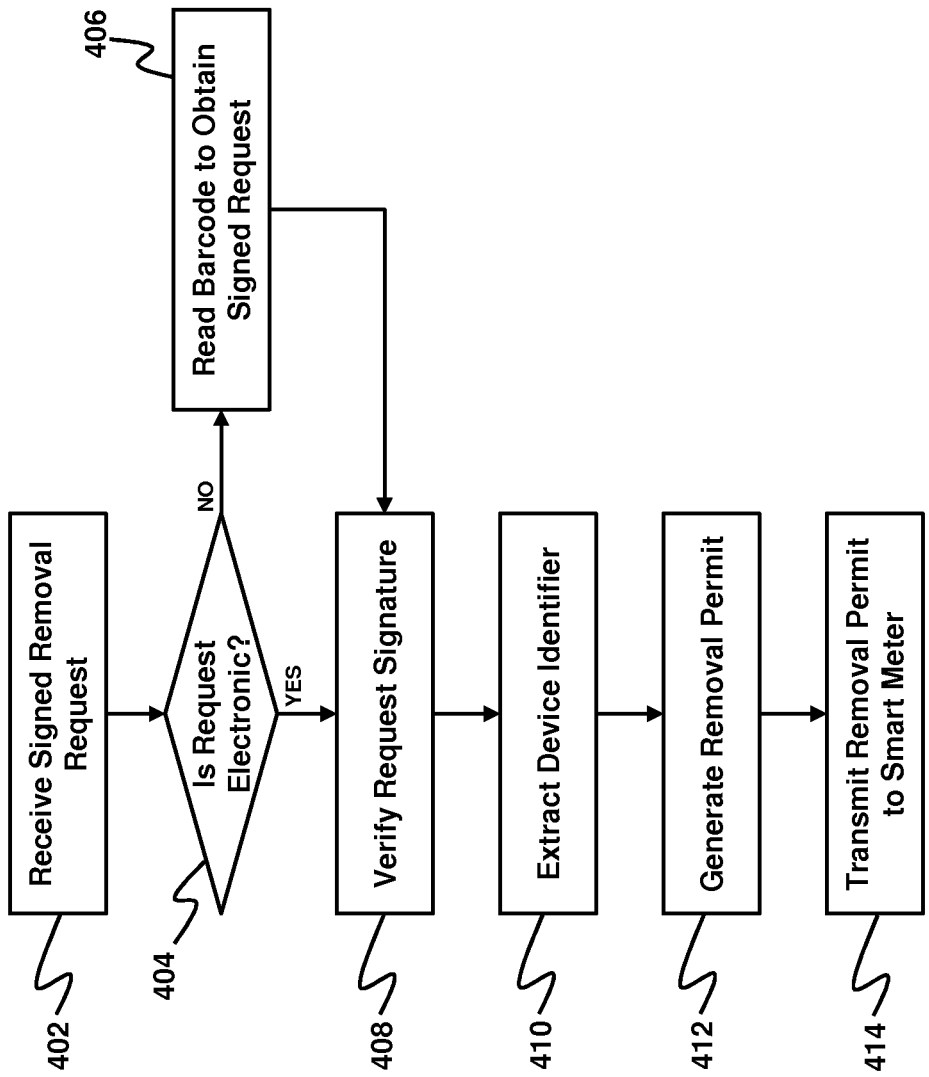
FIG. 4 is a flow diagram illustrating a method for removing security credentials from a smart grid device in accordance with exemplary embodiments.

FIG. 4 illustrates a method 400 for the removal of security credentials from a smart grid device, such as the smart meter 104, by the vendor 102.

In step 402, the receiving unit 304 of the vendor 102 may receive a signed removal request from the utility 106. In one embodiment, the signed removal request may be included in a barcode that is provided to the vendor 102, such as one affixed to the smart grid device or printed on accompanying documentation. In another embodiment, the signed removal request may be received via a communication from the utility 106. The signed removal request may include a device identifier associated with the smart grid device and may be signed by a private key of the utility 106.

In step 404, the processing unit 308 of the vendor 102 may determine if the signed removal request was received electronically or in another form, such as a barcode. If the request is in another form, such as in a barcode included in paperwork or affixed to the smart grid device, then, in step 406, the processing unit 308 may read and decode the barcode to obtain the signed removal request encoded therein. Once the removal request has been obtained, then, in step 408, the processing unit 308 may verify the request's signature. Verification of the request's signature may include verifying the signature using a public key that corresponds to the private key used to cryptographically sign the request. Systems and methods for verifying a signature using a public key will be apparent to persons having skill in the relevant art.

If the request verification fails, then the process 400 may be ended, as the vendor 102 may have received an unauthorized request and may therefore be unable to remove the security credentials from the smart grid device. If the request is successfully verified, then, in step 410, the processing unit 308 may extract the device identifier associated with the smart grid device from the removal request. In step 412, the processing unit 308 may generate a removal permit. The generated removal permit may include at least the device identifier. In some instances, the removal permit may further include an indication that the set of security credentials is to be removed, and/or an identifier of the set of security credentials to be removed.

In step 414, the transmitting unit 306 of the vendor 102 may transmit the removal permit to the smart grid device. The receiving unit 312 of the smart grid device may receive the removal permit, and then the processing unit 316 of the smart grid device may remove the set of security credentials from the memory 314. In some instances, the smart grid device may transmit a notification back to the vendor 102, to be received by the receiving unit 304, to indicate that the set of security credentials was successfully removed. The vendor 102 may then proceed with performing the necessary service or repairs on the smart grid device.

Techniques consistent with the present disclosure provide, among other features, systems and methods for removing credentials from a smart grid device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for removing credentials from a smart grid device, comprising:
   receiving, by a receiving device of a computing system of a first entity, a removal request, wherein
      the removal request includes a device identifier associated with a smart grid device,
      the removal request is signed by a second entity having generated a set of security credentials stored in a memory of the smart grid device,
      the removal request is signed using a private key possessed by the second entity having generated the set of security credentials,
      the set of security credentials restricts access to one or more components or operations of the smart grid device, and
      the first entity and second entity are separate entities;
   extracting, by a processing device of the computing system, the device identifier included in the received removal request;
   generating, by the processing device of the computing system, a permit configured to remove the set of credentials from the smart grid device, wherein the generated permit includes the extracted device identifier; and
   transmitting, by a transmitting device of the computing system, the generated permit to the smart grid device for removal of the set of credentials from the memory of the smart grid device.

2. The method of claim 1, wherein
   the set of security credentials are associated with an ownership state of the smart grid device, and
   removal of the set of credentials from the memory of the smart grid device reverts the smart grid device to an unowned ownership state.

3. The method of claim 1, wherein
   the smart grid device includes a barcode affixed thereto encoded with the removal request, and
   receiving the removal request includes reading, by a barcode reader, the barcode affixed to the smart grid device to obtain the encoded removal request.

4. The method of claim 3, wherein the barcode is formatted pursuant to the PDF417 standard.

5. The method of claim 1, wherein the device identifier is a media access control address.

6. The method of claim 1, further comprising:
   verifying, by the processing device, the received removal request using a public key related to the private key.

7. The method of claim 1, wherein the received removal request is received from the second entity associated with the set of credentials.

8. A system for removing credentials from a smart grid device, comprising:
   a receiving device of a computing system of a first entity configured to receive a removal request, wherein the removal request includes a device identifier associated with a smart grid device, and the removal request is signed by an a second entity having generated a set of security credentials stored in a memory of the smart grid device, the removal request is signed using a private key possessed by the second entity having generated the set of security credentials, the set of security credentials restricts access to one or more components or operations of the smart grid device, and the first entity and the second entity are separate entities;
   a processing device of the first entity configured to:
   extract the device identifier included in the received removal request, and generate a permit configured to remove the set of credentials from the smart grid device, wherein the generated permit includes the extracted device identifier; and a transmitting device of the first entity configured to transmit the generated permit to the smart grid device for removal of the set of credentials from the memory of the smart grid device.

9. The system of claim 8, wherein the set of security credentials are associated with an ownership state of the smart grid device, and removal of the set of credentials from the memory of the smart grid device reverts the smart grid device to an unowned ownership state.

10. The system of claim 8, wherein the smart grid device includes a barcode affixed thereto encoded with the removal request, and the system further comprises:

a barcode reader configured to read the barcode affixed to the smart grid device to obtain the encoded removal request.

11. The system of claim 10, wherein the barcode is formatted pursuant to the PDF417 standard.

12. The system of claim 8, wherein the device identifier is a media access control address.

13. The system of claim 8, wherein the processing device is further configured to verify the received removal request using a public key related to the private key.

14. The system of claim 8, wherein the received removal request is received from the second entity associated with the set of credentials.

\* \* \* \* \*